United States Patent [19]
Paoluccio

[11] Patent Number: 5,573,349
[45] Date of Patent: Nov. 12, 1996

[54] SEDIMENT DIKE WITH ABSORBER APPARATUS

[76] Inventor: John A. Paoluccio, P.O. Box 1316, 5038 Salida Blvd., Salida, Calif. 95368

[21] Appl. No.: 328,112

[22] Filed: Oct. 20, 1994

[51] Int. Cl.⁶ ..................................................... E02B 13/00
[52] U.S. Cl. ............................ 405/52; 210/170; 405/36; 405/128; 588/249
[58] Field of Search .................................. 405/21, 22, 26, 405/52, 53, 36, 37, 43, 45; 210/170, 747, 457, 437; 588/249

[56] References Cited

U.S. PATENT DOCUMENTS

| | | | |
|---|---|---|---|
| 2,658,622 | 11/1953 | Thornhill | 210/437 X |
| 2,946,450 | 7/1960 | Shaw | 210/437 X |
| 3,097,166 | 7/1963 | Monson | 210/170 |
| 3,722,686 | 3/1973 | Arnett et al. | 210/170 |
| 3,954,615 | 5/1976 | Shelef | 210/170 |
| 3,967,393 | 7/1976 | Nixon | 210/170 X |
| 4,162,976 | 7/1979 | Monson | 210/170 |
| 4,894,149 | 1/1990 | Block | 210/437 X |
| 4,997,312 | 3/1991 | Regan | 405/37 |
| 5,223,130 | 6/1993 | Valfrido | 210/170 |

*Primary Examiner*—Dennis L. Taylor
*Attorney, Agent, or Firm*—Robert S. Smith

[57] ABSTRACT

Apparatus for decontamination of a liquid which includes an outer envelope, apparatus for directing a liquid into the outer envelope, and apparatus for directing a liquid out of the envelope. The apparatus for directing the liquid out of the envelope includes an axial section of perforate duct and apparatus for absorbing contaminants disposed around the axial section of perforate duct, the apparatus for absorbing and the axial section of perforate duct are disposed within the outer envelope. In some forms of the invention the apparatus for absorbing contaminants is a particulate material which may be disposed within a sleeve shaped member. The apparatus for absorbing may include a central perforate tube disposed in generally concentric relationship to the sleeve shaped member and the central perforate tube may be in fluid communication with the exterior of the outer envelope. In many embodiments the outer envelope is substantially fluid impervious and may be an elongated body. The sleeve shaped member may be a second tube that is perforate and the apparatus may further include a prefilter disposed around the particulate absorber material and inside of the second tube. In some forms of the invention the apparatus further includes a fabric material, the particulate absorber material is disposed within the fabric material, and the fabric material has angular sectors defined therein to constrain movement of the particulate material. The angular sectors may be defined within an outer cylinder and an inner piece of fabric material may extend sequentially radially inwardly, a first arc, radially outwardly, radially inwardly, a second arc, and radially outwardly.

31 Claims, 8 Drawing Sheets

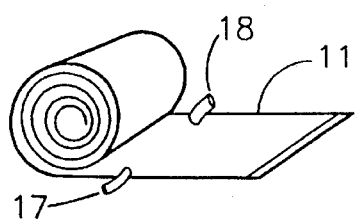
FIG. 4A
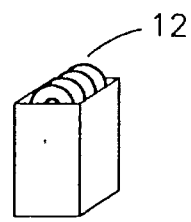
FIG. 4B
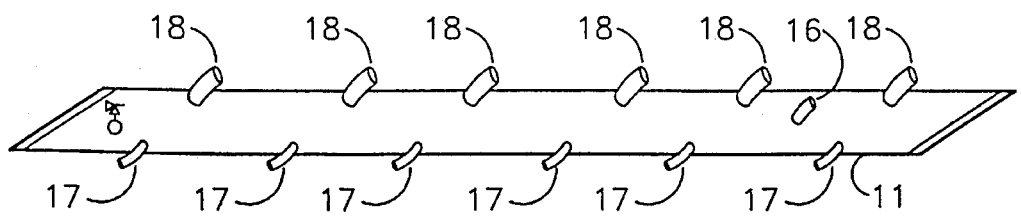
FIG. 4C
FIG. 4D
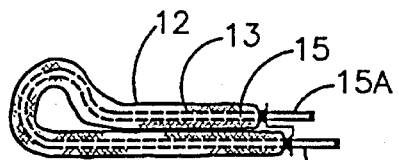
FIG. 4E
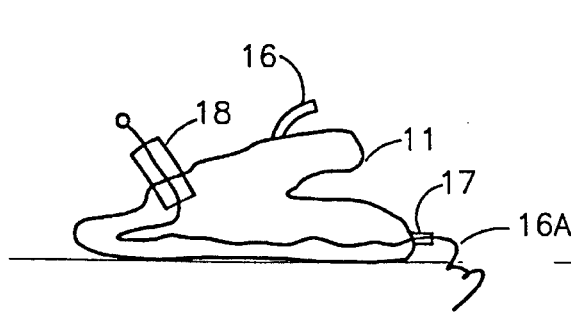
FIG. 4F
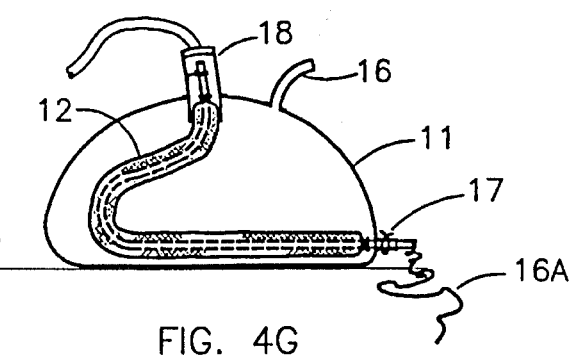
FIG. 4G
FIG. 4

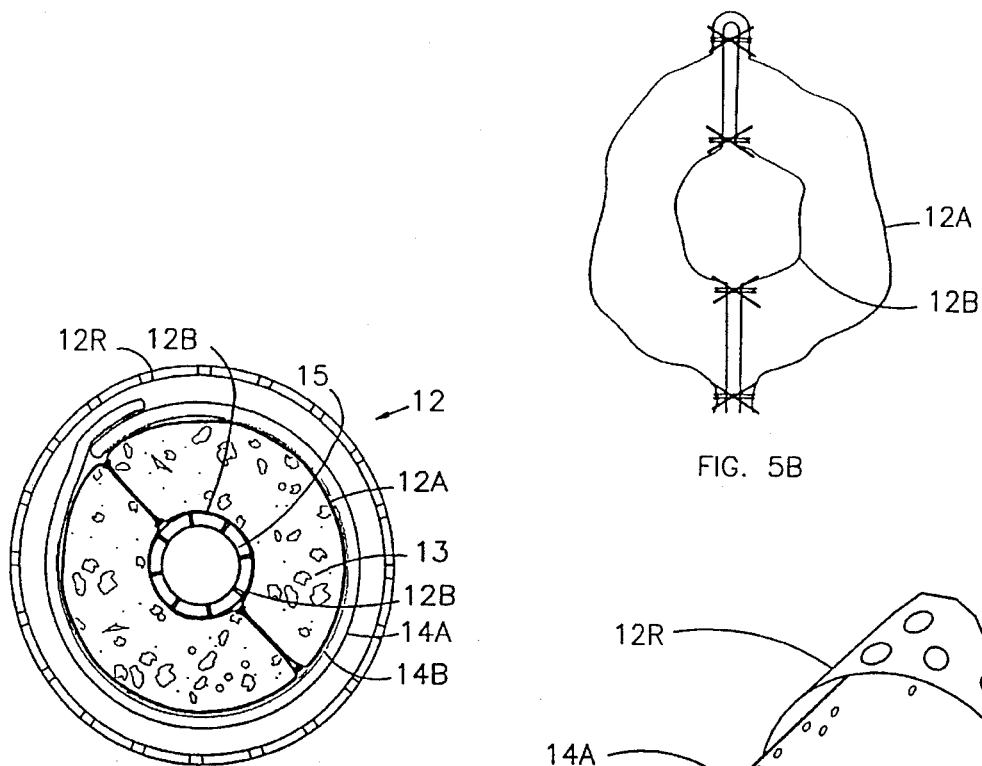
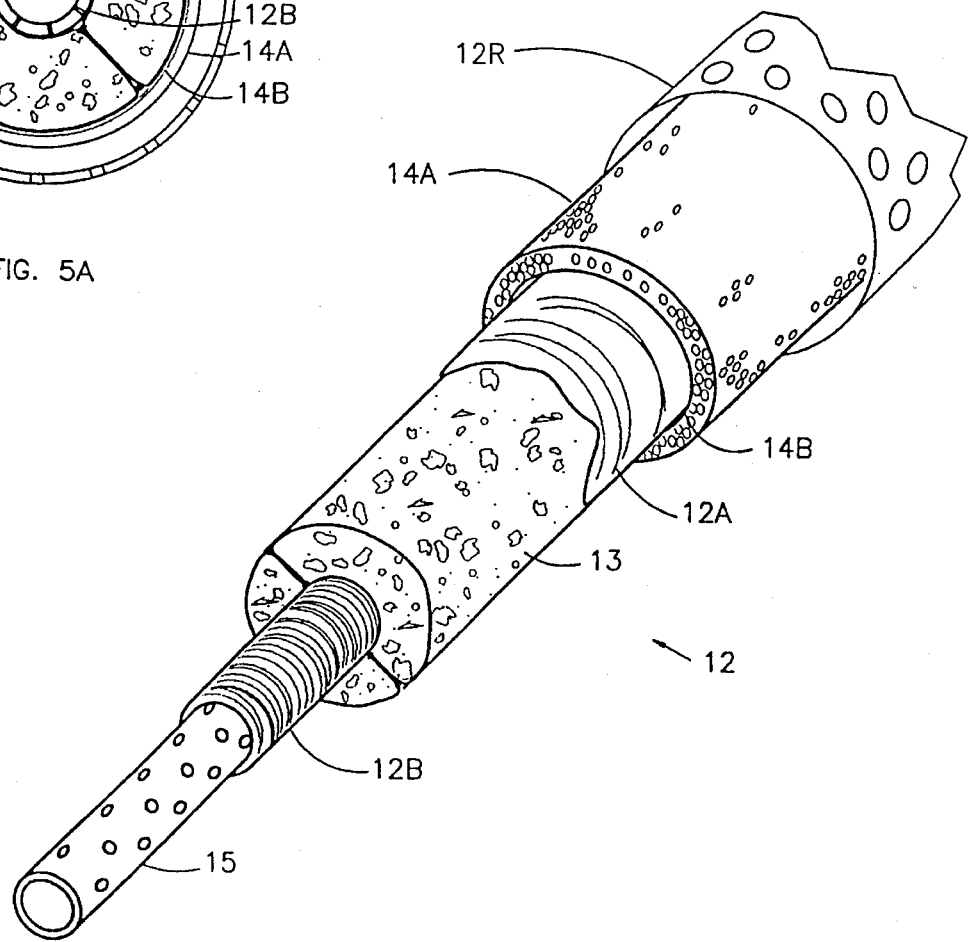
FIG. 5A
FIG. 5B
FIG. 5

SEDIMENT DIKE WITH ABSORBER APPARATUS

BACKGROUND OF THE INVENTION

The present invention relates to apparatus for the decontamination of liquids and particularly to apparatus and methods for removal of hydrocarbons and other chemicals from liquids. While the present invention has particular application to the decontamination of storm water runoff from roads and parking lots, it will be understood that the invention also has application to other decontamination problems. For example, ponds, lakes, streams, and other bodies of water may be treated using the present invention and that the invention may even be used for decontaminating other liquids.

This invention is related to the prior invention of the applicant herein which is described in U.S. Pat. No. 4,555,201 entitled "Sediment Dike". This prior invention includes a tubular impervious exterior wall and a porous wall. Water with sediment and other contaminants are pumped into the envelope. The sediment and other particulate matter is captured and contained within the walls thereby forming a sediment dike. The water drains through the porous wall and is thus filtered before it drains from the dike.

The present invention utilizes much of the apparatus described therein and it will be understood that the present invention incorporates by reference the disclosure therein.

For a number of years there has been an increasing emphasis on ecology issues. Recent laws and regulations continue this emphasis to protect the public health and safety by requiring that storm water run-off and other contaminated water sources be cleaned of certain harmful oils, antifreeze, other hydrocarbons and chemicals before leaving a building site. Many major factories and processing plants have numerous types of contaminants in the form of dust or spills. These contaminants may come from the factory itself or from fleets of trucks and other vehicles on the premises that contribute to the contamination of these sites. The danger is that these contaminants are carried away with the rainwater to eventually leech into the soil, enter storm drains, contaminate rivers and bodies of water and eventually contaminate the underground water table that is a source of drinking water. Numerous other contamination clean up problems can benefit from this invention. Accordingly, there has been a demand, for at least several years, for apparatus that will assist in cleaning up waste ponds, large industrial parking lots and other contaminated bodies of water.

The prior art includes numerous methods and apparatus to clean dirty storm water and other chemical spills and contaminated bodies of water. These include settling ponds, sand filtration systems, containment units with skimmers, and chemical additives mixed with the dirty water that causes the contaminates to precipitate from the solution, and combination strainers and filters. Absorbent pillows and socks are used to soak up and absorb oil spills by surrounding the spill or just being placed in the oil spill and absorbing the oil. These absorbers tend to float, do not allow for through flow. Typically, they will only contain very small spills. For example, they typically will contain spills that are no more than a small percentage of their normal 3" height.

It is believed that all of the existing methods fail to clean the dirty water in a practical manner. Many of the chemical absorbent types quickly become blinded on the outermost surface due to all the sediment debris and contaminates that are exposed to the outer surface. The term blinded means that the outer surface or covering of the absorbent becomes plugged up with sediment, slime, debris, and other particles or solutions, thereby preventing further water flow through the absorber material. This blinding condition renders the balance of the absorbent, in that flow path, ineffective because it is not exposed to dirty water flow through the material. Therefore, the sock type absorber quickly loses utility.

The prior art apparatus and methods may do a good job with certain contaminants but fail to remove others. Most of these methods inherently have a high initial cost, a high operating cost, and are very complex to use. The net result is that there has not been a practical method of collecting and filtering out the rather minute levels of hydrocarbons and chemicals found in large bodies of water with sediment such as found in storm water run-off. This has led to the contamination of many sites remote from the site of the original contamination including the contamination of the underground water table.

It is an object of the present invention to provides for a very convenient and practical method of cleaning storm water run- off from parking lots, ponds or almost any contaminated body of water.

BRIEF DESCRIPTION OF THE DRAWINGS

The invention will be better understood by reference to the accompanying drawing in which:

FIG. 4A is a perspective view of the sediment dike apparatus which is stored rolled up being unrolled in preparation for use.

FIG. 4B is a perspective view of a box of stored absorber tubes intended for cooperation with the dike shown in FIG. 4A.

FIG. 4C is a perspective view of the dike of FIG. 4A rolled out to a flat position.

FIG. 4D is a schematic view of the cross-section of the dike when it is empty.

FIG. 4E is a schematic view of a single absorber tube of the type that is installed within the dike.

FIG. 4F is a schematic view illustrating the manner in which each of the absorber tubes is installed in the dike.

FIG. 4G is a schematic view illustrating the positioning of the absorber tube within the dike after the dike has started to fill.

FIG. 5 is a perspective view of the absorber tube in which the various layers thereof have been broken away to better illustrate the construction.

FIG. 5A is a cross sectional view taken along a plane that is perpendicular to the axis of the absorber tube.

FIG. 5B is a schematic view of the fabric sew points and seams of the fabric shown in FIG. 5A.

SUMMARY OF THE INVENTION

Figure 1:
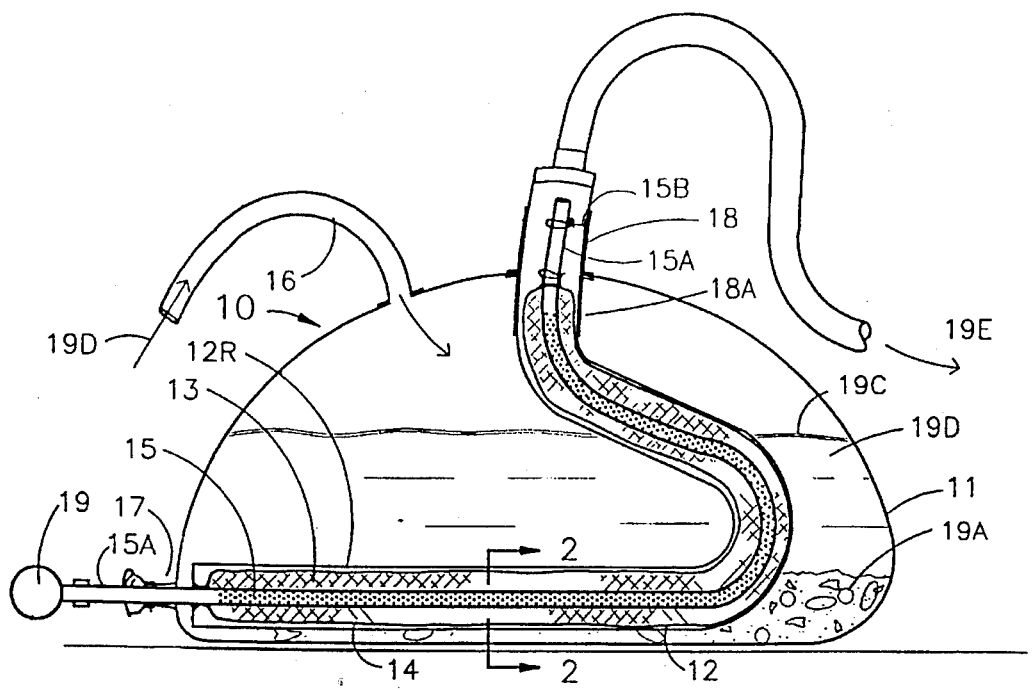
FIG. 1 is a partially schematic, partially sectional view of the sediment dike and absorbent apparatus in accordance with one form of the invention.
Figure 2:
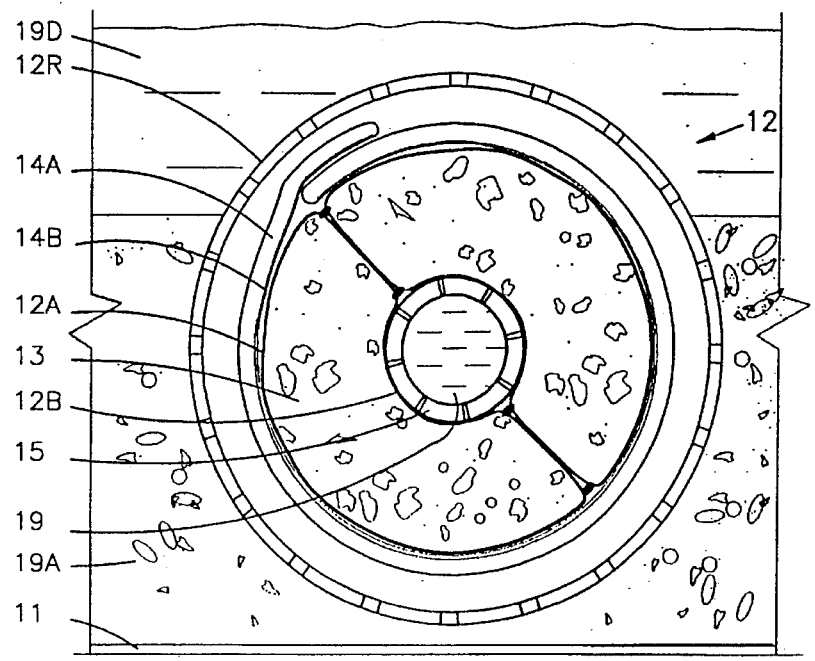
FIG. 2 is a sectional view along the line 2—2 in FIG. 1.

It has now been found that these and other objects of the invention may be attained in apparatus for decontamination of a liquid which includes an outer envelope, means for directing a liquid into the outer envelope, means for directing a liquid out of the envelope, the means for directing the liquid out of the envelope including an axial section of perforate duct and means for absorbing contaminants disposed around the axial section of perforate duct, the means for absorbing and the axial section of perforate duct being disposed within the outer envelope.

In some forms of the invention the means for absorbing contaminants is a particulate material which may be disposed within a sleeve shaped member. The means for absorbing may include a central perforate tube disposed in generally concentric relationship to the sleeve shaped member and the central perforate tube may be in fluid communication with the exterior of the outer envelope. In many embodiments the outer envelope is substantially fluid impervious which may be an elongated body.

The sleeve shaped member may be a second tube that is perforate and the apparatus may further include a prefilter disposed around the particulate absorber material and inside of the second tube. In some forms of the invention the apparatus further includes a fabric material, the particulate absorber material is disposed within the fabric material, the fabric material has angular sectors defined therein to constrain movement of the particulate material. The angular sectors may be defined within an outer cylinder and an inner piece of fabric material may extend sequentially radially inwardly, a first arc, radially outwardly, radially inwardly, a second arc, and radially outwardly.

The apparatus may further includes means to maintain the apparatus floating in a body of water. The means to maintain the apparatus floating may include an elongated chamber extending along substantially the entire axial extent of the outer envelope. Some forms of the invention further include in addition to the means for absorbing a plurality of additional means for absorbing and each of the means for absorbing extends generally laterally with respect to the elongated outer envelope. Some forms of the invention have the outer envelope dimensioned and configured for cooperation with an external member such as a pail or a catch basin.

DESCRIPTION OF THE PREFERRED EMBODIMENTS

The apparatus and method of the present invention provides a simple and inexpensive method that takes advantage of the following principals in one self contained unit:

The invention in one form includes a large impervious barrier in the shape of an elongated tube or dike. Within the dike is an absorbing portion that is contained within a strainer fabric and a cleanable prefilter. The absorber also has a flexible perforated drain tube that exits the dike. Dirty water containing sediment, rocks, sand and other particulates is pumped in and is captured between the prefilter portion and the impervious barrier portion. The hydrocarbons and chemicals in solution pass on through the interior fabric strainer and into the absorber material. The absorber material has an affinity for absorbing the hydrocarbons and chemicals and captures these contaminants. The water passes right through the absorbent material and into an interior drain tube. The cleaned water then exits the dike. When saturated with chemicals or sediment the pumped dirty water will fill the dike and then exit a overflow tube indicating that it is time to clean the prefilters or change over to another unit. This invention includes a cleanable prefilter to minimize the probability of the surface becoming blinded with clay or other material having particles that will tend to blind the absorber. This blinding condition renders the balance of the absorbent, in that flow path, ineffective because it is not exposed to dirty water flow through the material.

The present invention is characterized by the following features:

1. Provides for a substantial containment envelope or dike 11 to continually receive large quantities of the pumped dirty water. Then, because of its large surface area and volume, it slows down the turbulent dirty water and allows the heavy particles and silt to settle out and sink. More particularly, the method in accordance with the invention also allows the light particles to float to the surface. The containment portion of the dike can be quite large and hold a large volume of water and sediment and still be quite inexpensive.
2. Provides a perforated semi-rigid sleeve portion that protects the surface of the absorber from damage from sharp rocks and debris and provides a clear space for easy removal of the absorber tube. When the surface of the absorber or prefilter is blinded the entire absorber tube and prefilter is removed for cleaning, inspection, replacement or disposal.
3. Provides for a removable and cleanable prefilter portion that surrounds the absorber to protect the surface from blinding and allows water, oil and chemicals in solution to flow through while restraining the solid particles.
4. The interior absorber material is contained within a finer mesh strainer fabric or cloth for extended surface area and to further filter out the sediment particles.
5. The absorber material captures and removes substantially all the oils, hydrocarbons and chemicals from the dirty water as it travels through the absorbent material. Once oil is absorbed by the absorbent material the oil cannot be removed with water. The oil, hydrocarbons, and chemicals are, therefore, isolated or contained.
6. The cleaned water continues draining through the absorbent material and passes through another portion of the strainer fabric surrounding a perforated flexible drain hose near the center of the absorber. The cleaned water then enters the perforated hose and exits the dike.

The present invention is advantageous for the following reasons:

This invention puts to use the maximum capability of each component to deal with the relatively low quantities of oils, hydrocarbons and other chemicals typically found in sumps and storm water run-off. The large exterior envelope 11 provides a buffer or reservoir where entering dirty water can settle out the particulate matter keeping if from contacting and blinding the absorber surface. The surface area of the absorber material is protected with a cleanable prefilter to minimize blinding of the absorbent tube. The absorbent material is positioned within fabric covered tubes from the bottom to full height within the envelope dike. This insures that as the lower portions become saturated with oil or blinded new absorber surface will be exposed to the lighter hydrocarbons all the way to the top of the dike. By the unique arrangement of the straining fabric, absorbent material and the perforated drain hose it becomes an ideal collector and cleaner of almost any dirty water system application. When the unit becomes full of sediment or when the absorbent becomes blinded or saturated the envelope becomes full and drain water will exit the overflow tube. At this point switch over to a different unit would be made. The spent containment unit then could be allowed to further drain itself of water and dry out for disposal when time permits.

Figure 3:
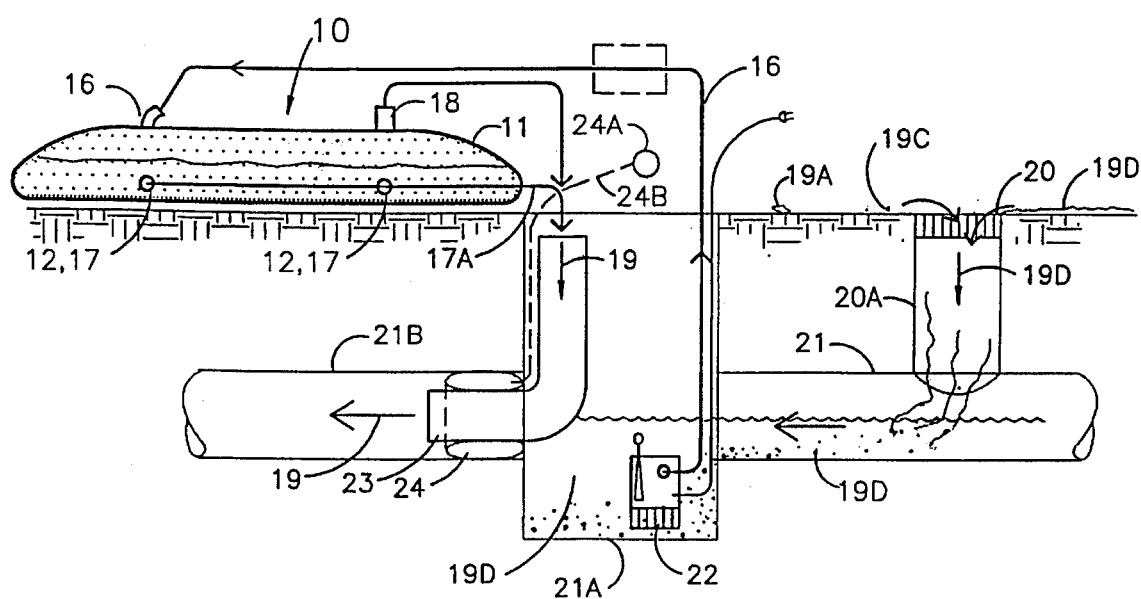
FIG. 3 is a partially schematic view showing the manner of use of the apparatus to clean up runoff: water in a storm drain such as from a large parking lot.

Referring now to FIGS. 1–5 and particularly to FIG. 3, there is shown a roadway or parking lot 20 having a drain disposed at a relatively low part thereof. This construction is of conventional design in which storm water run-off 19D is directed to a large storm drain pipe 21 leading to a catch basin 21A The normal outlet pipe 21B is essentially sealed off by a pipe 19 and inflatable seal 24 that will be described in greater detail hereafter. A sump pump 22 pumps the storm water runoff 19D to the sediment dike and absorber apparatus 10. It will be understood that all the rocks, sand and debris, oil and antifreeze from parked automobiles, and many other harmful hydrocarbons and chemicals are mixed with the storm water run-off 19D and will be pumped to the sediment dike and absorber apparatus 10.

FIGS. 1, 2, 5 and 5A show the preferred form of the apparatus in accordance with the invention in which a sediment dike and absorber apparatus 10, provided with an impervious exterior barrier envelope 11, is disposed within a perforated sleeve 12R. This perforated sleeve 12R holds a plurality of concentric members in place. As best seen in FIGS. 5 and 5A, disposed in concentric relationship within the perforated sleeve 12R are a plurality of members that are progressively smaller in outside diameter. The sleeve 12R and the members therein are collectively referred to herein as the absorber tube 12.

In the preferred embodiment, there is a first member that is a deep bed loading foam prefilter 14A disposed within the perforated sleeve 12R. More particularly, the prefilter is disposed in side of, in side abutting relationship, to the sleeve 12R. The second member, going from the outer part of the absorber tube 12 toward the center thereof is a fine mesh fabric prefilter 14B. The third member is a fabric filter 12A. The fourth member is an absorbing material 13 to be described hereafter that absorbs hydrocarbons, oils, and other chemicals that contact the absorbing material 13. After passage through the these materials the cleaned water or other liquid flows into a perforate or perforated pipe 15. Because the absorber 13 is ordinarily saturated, the water will flow along the axial extent of the perforate pipe 15 into an imperforate axial section 15A which is disposed in coaxial overlapping relationship with an axial section of imperforate drain tube 17 through which the cleaned water 19 drains.

It will thus be understood that the cleaned water 19 flows through the sediment dike and absorber apparatus 10 and the heavy large particles 19A will settle out within the impervious exterior barrier 11 and the perforated sleeve 12R of the invention. Dirty water with particles and chemicals are then strained through the prefilter 14 that is one of the outer parts of the absorber tube.

The prefilter 14 may include a deep bed loading foam filter 14A and a fine mesh filter fabric 14B. The strained water flows through the fabric 12A. The strained water, hydrocarbons and chemicals flow through the fabric strainer 12A, and thus discrete particles are filtered out. The hydrocarbons and chemicals 19C encounter an absorbing material 13 within the absorber tube 12 and are absorbed on contact. The cleaned water 19 flows through as the absorbent 13 that has an affinity for holding the hydrocarbons and chemicals 19C and not the water 19. Within the approximate center of the absorber material 13 portion, the water 19 passes through another strainer fabric 12B and into a perforated flexible drain hose 15. The drain hose 15 exits the device where the cleaned storm water 19 can now safely go down the drain system 25 without fear of contaminating the groundwater.

FIG. 3 is a schematic flow diagram of a storm drain system with the sediment dike and absorber apparatus 10 cleaning the water. A sump pump 22 is positioned within the main catch basin 21A, a diverting elbow 23 with sealing bladder 24 is inserted into the outlet 21B of the catch basin 21A. The storm water 19D is pumped to the sediment dike and absorber apparatus 10 where it is strained and cleaned of chemicals as it passes through the absorber tube portion 12. The cleaned water 19 drains back through the diverting elbow 23 and into the drain system 25 leaving the site. The bladder seal 24 may include a remote air bulb 24A.

As best seen in FIGS. 4A–4G the sediment dike and absorber apparatus 10 is stored in the dry rolled up position until, ready for use. When ready for use it is merely rolled in the flat position. Because the material is lightweight, one person could easily handle a dry 20 foot long unit that measures approximately 2' in diameter.

The sediment dike and absorber apparatus 10 may contain any number of openings 18 for absorber tubes 12. For example, in one preferred embodiment twenty absorber tubes 12 may be installed in one sediment dike and absorber apparatus 10. In a preferred form of the invention each absorber tube 12 measures 4' long and is approximately 3" in diameter. A 1" perforated drain hose 15, covered with strainer fabric 12B, runs within the center of each absorber tube 12 and non-perforated hose 15A (as shown in FIG. 4E) extends from the ends of the absorber tube 12 for drain purposes. This arrangement requires that any fluid that flows through the exterior of the absorber tube 12 will travel through approximately 1" of absorber material 13 before reaching the perforated drain hose 15. One simple fabrication method that insures a fairly uniform absorber material thickness uses two pieces of fabric sewn together to form the fabric sleeves 12A and 12B within the perforated sleeve 12R as shown in FIG. 5. A perforated drain hose 15 is disposed within and in concentric relationship with the absorbent material 13. The absorbent material 13 is then surrounded with a prefilter 14 and slipped into a perforated semi-rigid sleeve 12R. The absorber tube 12 is constructed so that a liquid head equal to the combined height of the dike plus the elevated overflow tube 18, provides sufficient head pressure to overcome the flow resistance through the side walls of the absorber tube 12. The combination forms an absorber tube 12 of uniform absorber thickness. Tests have shown that each absorbing tube 12 may strain 5 to 10 gallons of dirty water every minute and may absorb one gallon of oil or hydrocarbon fluid 19C before saturation occurs. Of course many other shapes and configurations could be used although the illustrated construction is preferred.

This invention includes an exterior perforated tube 12R that allows for 100% straining area around the absorber tube and maximum absorbent media exposure to the contaminated water. The contaminated water only needs to flow through approximately 1" of absorbent media before the cleaned water encounters an interior drain off hose 15. This hose is covered with a strainer fabric that holds back the absorbent material but allows the cleaned water to flow through.

During the erection of the unit the exterior envelope 11 is laid out at the point of use. A pull string 16A is initially disposed to extend through the axial extent of the imperforate drain tube 17 and the axial extent of the overflow tube 18 as well as the intervening portion of the envelope 11. This is done in order to allow convenient storage of the apparatus in a flat rolled up position before use as shown FIG. 4A. When the user intends to place the apparatus in service, one of the absorber tubes 12 is connected to one of the pull strings 16A and pulled through the large overflow tube 18. When in proper place the non-perforated hose 15A extends through the envelope drain tube 17 and the other end of the hose is tied to the overflow tube 18. Thus, the absorber tube extends the full vertical extent of the dike for full height draining and cleaning.

During low flow rates which is the most common application, some lightweight oils will float on the surface of the water within the sediment dike and absorber apparatus 10. This oil tends to migrate to the elevated portion of the absorbent tubes 12 where the oil is continually absorbed. This occurs at all times during the cleaning process. During normal operation the envelope may only become half full of dirty water. Water may never even exit the overflow tube. This is the desired method of operation. This allows for longer retention time with low elevation head pressure of 1 or 2 feet of water to overcome the resistance of the draining and cleaning process. Eventually the individual absorbing tubes may become saturated or blinded by the contaminants. As this occurs the water level in the dike rises until the overflow tube is reached. At this point some water may start to overflow the dike without being cleaned. This is a visual indicator that it is time to clean the prefilter 14 or change to another unit. The overflow tube 18 also has a dip tube feature that prevents the lightweight oil from escaping the overflow when the dike is full. The dirty water several inches below the water surface enters and exits the overflow tubes.

Another purpose of having the absorber tubes 12 inserted after the envelope 11 is laid out is because a different type absorbent media may be required. Even though the primary absorbent material may handle most applications in some instances it may be desirable to change to a different specific type absorbent material for various applications. The preferred form of the primary absorbent material (1) has been found to work extremely well, (2) does not generate dust during assembly, and (3) is easy to handle. The preferred form is a treated wood pulp media. A preferred form of wood pulp media material made from natural cellulose fibers is a waste product of the paper industry such as that manufactured by Absorbent Corporation of Bellingham, Wash. The manufacturer refers to this raw material as Absorbent W. This material absorbs oil based liquids while repelling water. Tests with this type of absorber media indicate flow rates dependent on the density and thickness of the packed media in the absorber tubes. This media is light weight, highly porous, safe to handle, low in cost and easy to work with.

Another suitable absorber material utilizes Aluminum Silica having a whitish free flowing aggregate appearance. The material is formulated in such a manner as to enhance the absorption rate of hydrocarbon liquids and chemicals. One form of the absorbent material is manufactured by X-Sorb and marketed by JAM Dist. of Manteca, Calif. This material is highly efficient but has less flow capacity and a greater pressure drop. In addition, this media requires a much finer fabric covering on the absorber tube due to its fine composition.

Numerous other types of absorbent materials may be used as the absorbent media within the absorber tubes of the present invention. Such other materials may be used alone or with the absorbent materials referred to herein for various applications.

The absorbent material may also be treated with some other chemical or media for odor control, biological digestion control, or gas absorption. The media may contain activated charcoal, treated sawdust, treated paper or sponge, microbes or any neutralizing agent desired.

In a preferred form of the invention the exterior envelope 11 is made of a barrier material such as 36 Mil double coated material such as that identified by the Dynaloy trademark and sold in cylindrical envelopes sealed at both ends by Palco Linings, Inc. of Stanton, Calif. This material is constructed from two plies of Dynaloy PVC sheeting laminated together over opposite faces of one ply of 9×9-1000 denier polyester fabric. This material has good tear resistance and puncture resistance qualities and is also UV light resistant.

The seams in the preferred embodiment are all factory dielectric seams. Grommets are preferably provided in the seam ends to secure the dike in position once put in place. Units 18" in diameter by 20' long were found to be a practical size to handle. Other materials could be used however this general type material is resistance to most chemicals and hydrocarbons. The enclosure is tough and durable and helps to contain the sediment and contaminants for proper disposal.

Smaller assemblies may be manufactured of a clear lightweight plastic material if desired. For example, a tough polyethylene tube having a thickness of five to nine mils and sealed at the ends is satisfactory. One such material is manufactured by Ag-Bag Corp., Warrenton, OR. The size of the unit will vary for the application. In various forms of the invention the units may be 1' round by 4' long or 2' round by 20' long or any other shape or dimension appropriate. The shape of the exterior barrier may be also be made to fit into a 55 gallon drum for ease of use and disposal or to suit the size and shape of a trailer, dumpster or other container. The exterior of the barrier may also be fitted with hooks or straps as required.

While the form of the invention described above utilizes a flexible outer envelope, it will be understood that for some applications, particularly applications requiring a relatively small assembly, that a rigid outer envelope may also be utilized.

The strainer material formed in a sleeve 12A may be a plastic or cloth fabric or almost any perforated strainer material. In certain type soil areas one type may be preferred over another depending on the clay and sand content of the sediment or other contaminants. The main strainer material protects the extended surface absorber tubes 12 that may have a fine cloth close mesh covering for finer filtering.

When a course fibrous material such as the preferred treated wood pulp is used as the absorber media a coarse mesh fabric sleeve may be used such as the sleeves 12A and 12B. Because the media is ordinarily a loose particulate material it is somewhat difficult to maintain the media in concentric relationship with the perforated flexible drain hose 15. The preferred approach to achieving the preferred concentric relationship is best shown in FIG. 5B. FIG. 5B is a cross sectional view of only the fabric sleeves 12A and 12B before the media 13 is added and before the media is positioned in concentric relationship with respect to the perforated flexible drain hose 15. FIG. 5B will be understood to show one piece of material defining the sleeve 12A and a second piece of material defining the sleeve 12B. The sleeves 12B will be understood to start at the juncture with the sleeve 12A extend vertically downwardly, into in a generally arc shape form from the 12 o'clock position to the generally six o'clock position, extend vertically downwardly, extend vertically upwardly to the generally six o'clock position, extend in a generally arc shape to the generally 12 o'clock addition, and then extend vertically upwardly to a juncture with the sleeve 12A. This arrangement is made possible by the four sew points illustrated in FIG. 5B. This construction defines angular sectors that constrain movement of the particulate material. When the particulate material fills the annular sectors within the annular region intermediate the sleeves 12A and 12B, the sleeves 12A and 12B assume the cylindrical shape shown in FIG. 5A. Accordingly, the perforated tube 15 is properly positioned in concentric relationship within the absorber 13 even if the tube 15 is bent to accommodate a particular installation. The location insures that the contaminates within the dirty liquid will come in contact with the absorbent material as the dirty liquid flows to the perforated tube 15.

The wood pulp media with its highly porous fibers can also act as a deep bed filter and in certain applications the prefilters and other strainer coverings may be eliminated. However, the life of the media is substantially increased if a prefilter is used.

The perforated drain hose within the absorber may be a plastic or rubber hose or other drainage conduit. A number of draining or straining materials, such as those manufactured from recycled plastics such as the Quline Polyester Geotextiles by Wellman Inc., of Commerce, Calif. The polymer for this material is manufactured from approximately 97 percent used plastics such as PET bottles. The manufacturer claims to reprocess approximately 500 million PET bottles per year in its geotextile products. The process involves using a needle loom in a nonwoven process where carefully blended fibers are combined into a uniform web, crosslapped and locked with needling and finishing. The resulting fabric like material is ideal for straining, filtering and draining soil particles from water. The material comes in a broad range of thicknesses suitable for the fabric coverings and prefilters in the present apparatus.

In one form of the invention the absorber tube 12 may be slipped into a rigid sleeve 12R in order to allow for changing out the spent absorber tubes 12 with new ones at any time. This arrangement allows for the absorber tubes 12 with captured oil to be removed for special disposal while the bulk of the sediment, rocks, sand and debris can be disposed of or recycled separately.

Figure 6:
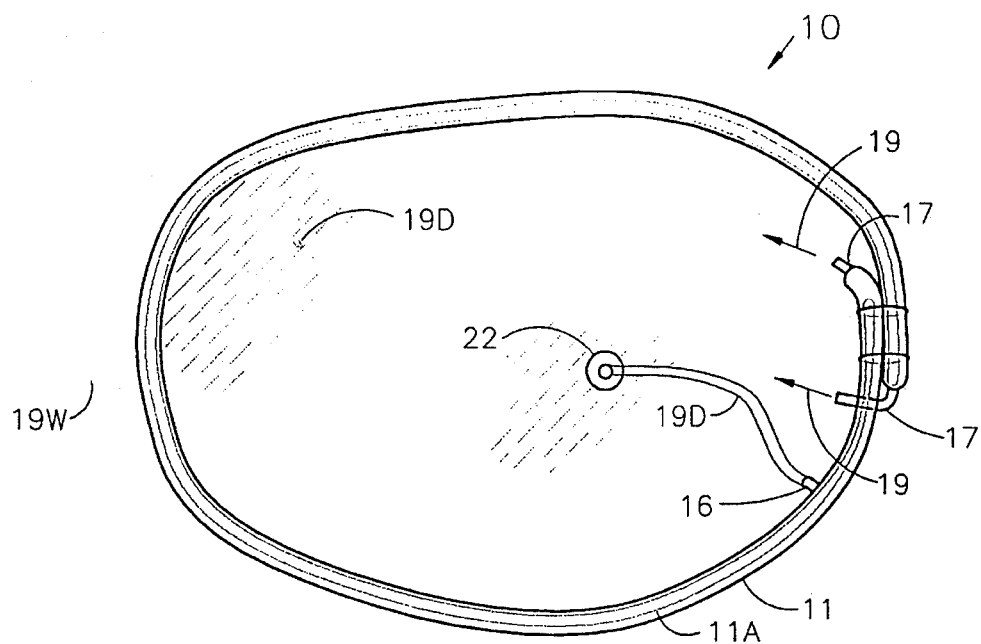
FIG. 6 is embodiment of the sediment dike and absorber apparatus surrounding an oil spill on a large body of water.
Figure 7:
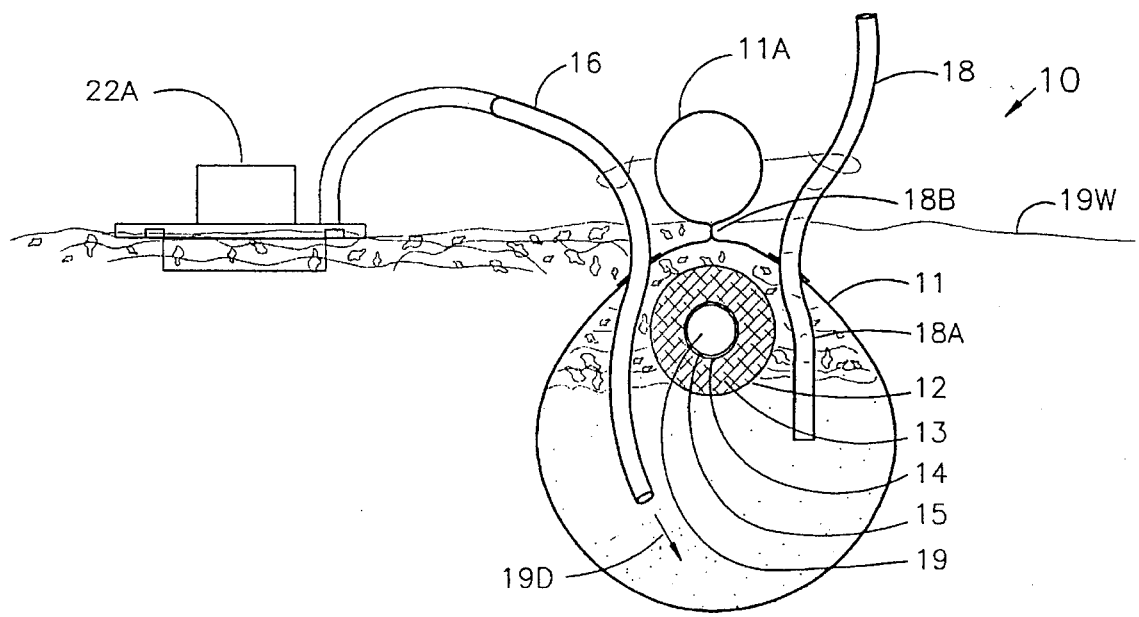
FIG. 7 is a partially cross sectional view of the apparatus shown in FIG. 6 where the cross section is taken along a vertical plane that is perpendicular to the axis of the dike shown in FIG. 6.

Referring now to FIGS. 6 and 7 there is shown an embodiment of the sediment dike and absorber apparatus surrounding an oil spill on a large body of water. FIG. 7 is a partially cross sectional view of the apparatus shown in FIG. 6 where the cross section is taken along a vertical plane that is perpendicular to the axis of the dike shown in FIG. 6. The apparatus is generally similar to the apparatus described above with the addition of a flotation chamber 11A that extends along the entire axial extent of the dike 11 with substantially the same absorber apparatus disposed therein. A floating member 22A supports an intake and pumps a liquid from the intake through a tube 16 to the interior of the envelope 11. In other respects the apparatus is similar.

Figure 8:
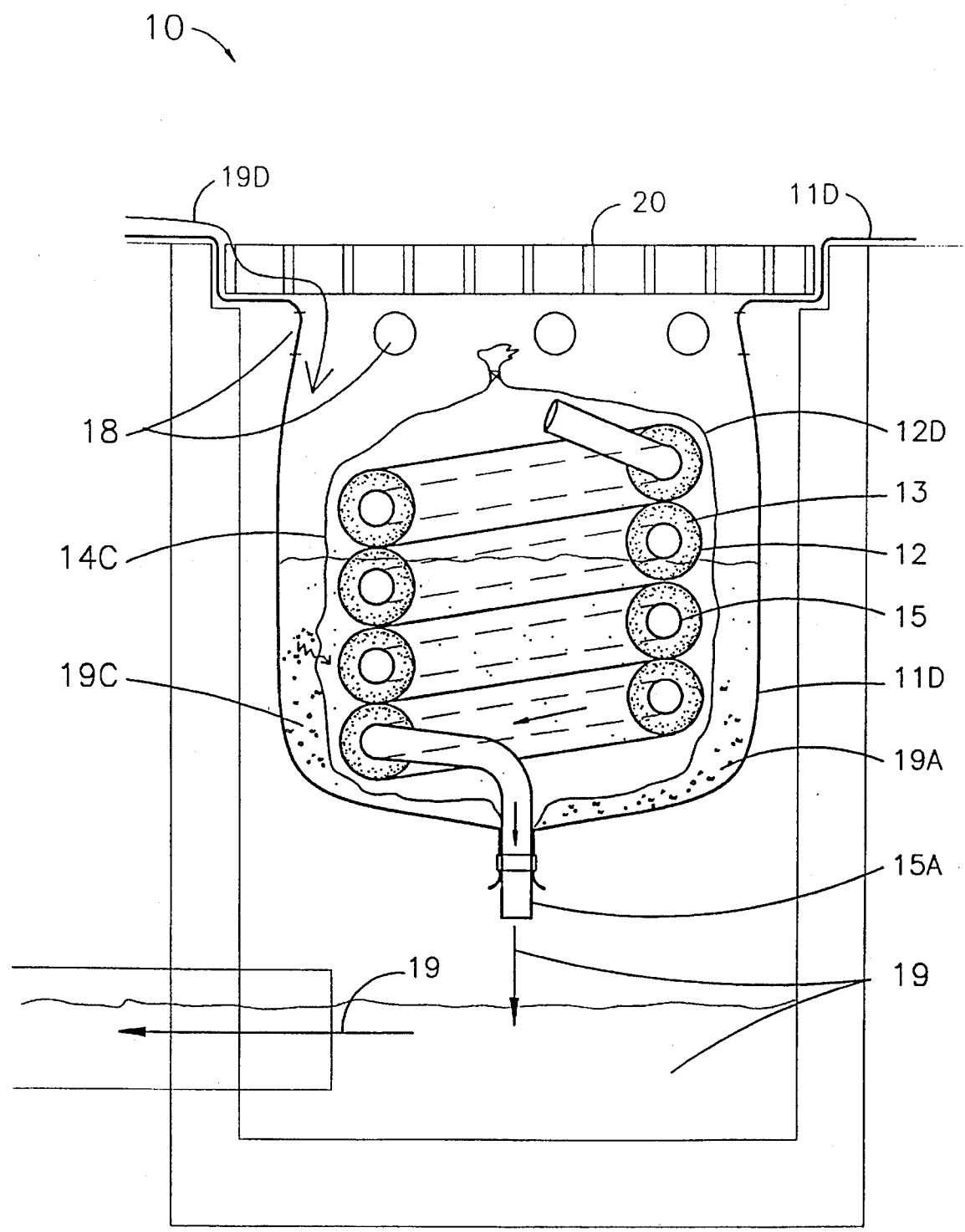
FIG. 8 is a partially cross sectional view of another embodiment of the apparatus in accordance with the invention installed in a catch basin or storm drain.

FIG. 8 is a partially cross sectional view of another embodiment of the apparatus in accordance with the invention installed in a catch basin or storm drain. This embodiment includes a fluid impervious plastic bag with an upper collar or holding straps to attach the bag 11D to the top of the catch basin grate opening. As will be seen in FIG. 8 the bag 11D extends around the sides of the grate 20. The bag 11D is provided with over flow holes in the event that the rate of flow into the bag exceeds the capacity of the apparatus. The outlet of the bag is disposed at the bottom thereof. That output is clamped to the hose 15A from which the cleaned drain water exits.

In operation of the apparatus shown in FIG. 8 operation for a one or two month period during which 100,000 gallons of contaminated water would flow through the apparatus in the storm drain the output might typically be 99,990 gallons of clean water, 9 gallons of sediment and debris, and 1 gallon of oil and chemicals.

Figure 9:
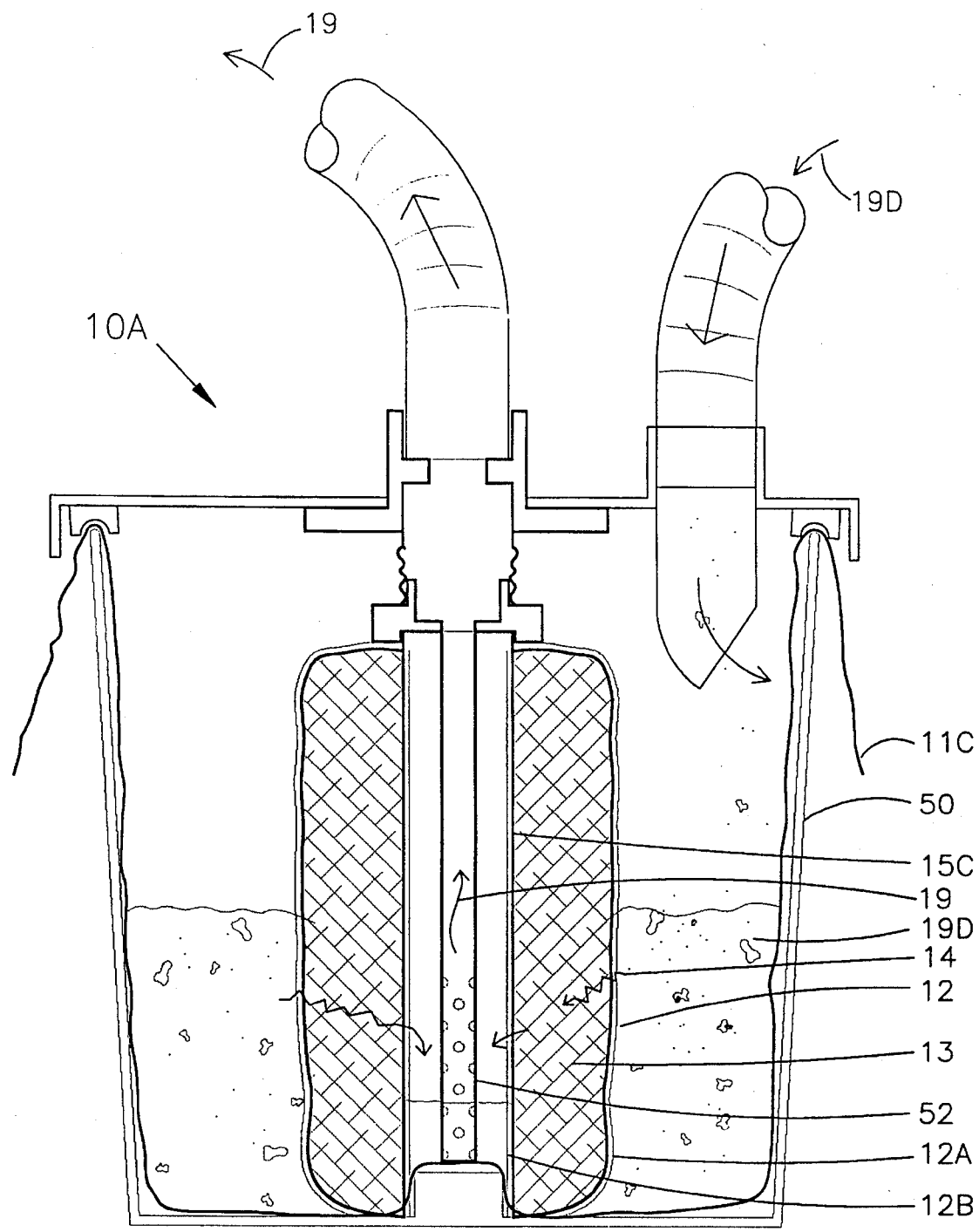
FIG. 9 is a partially cross sectional view of another embodiment of the invention, particularly adapted for use in cleaning up small contaminant spills, which is intended for cooperation with an associated shop wet vacuum apparatus.

FIG. 9 is a partially cross sectional view of another embodiment of the invention, particularly adapted for use in cleaning up small contaminant spills, which is intended for cooperation with an associated shop wet vacuum apparatus. The apparatus shown in FIG. 9 has an inlet hose which is used to draw in contaminated liquid 19D. Cleaned liquid 19 exits through an outlet tube. The outlet tube is connected to the shop wet vacuum (not shown). In other words, the apparatus of FIG. 9 is merely connected in series to the inlet of the shop wet vacuum. Ordinarily a flexible bag 11C is positioned within a rigid pail 50. The absorber assembly including a perforated tube 52 is located by physical connection to the top of the pail 50.

Figure 10A:
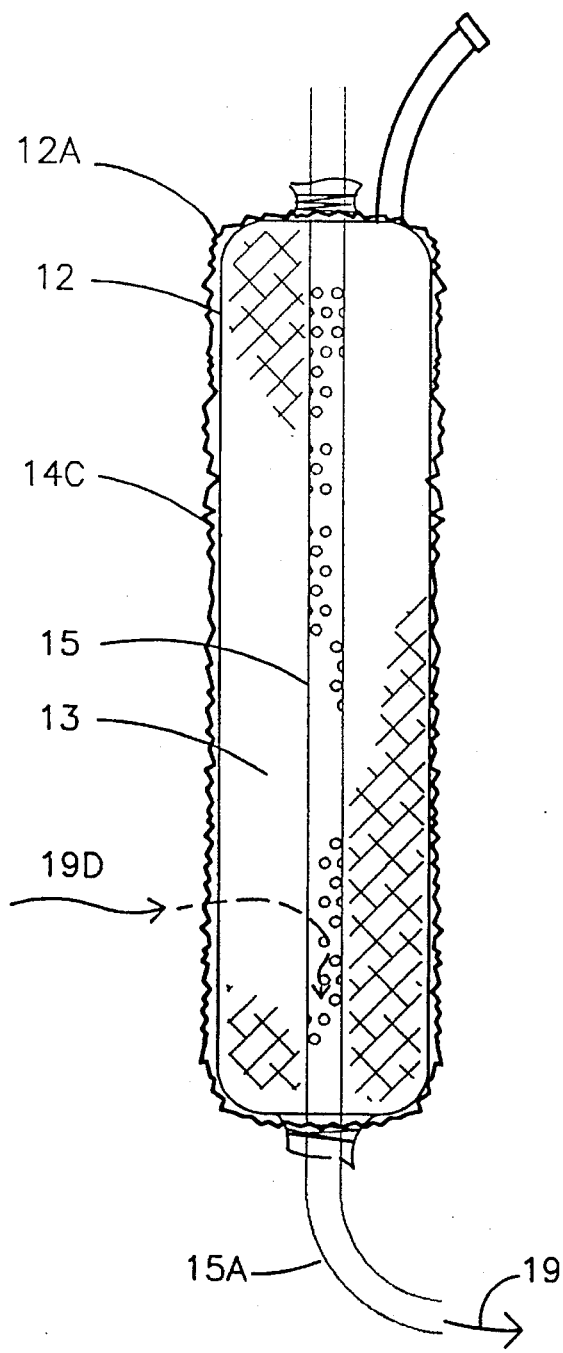
FIG. 10A is a partially schematic cross sectional view of an absorber tube construction, which includes a purge tube, during normal operation.
Figure 10B:
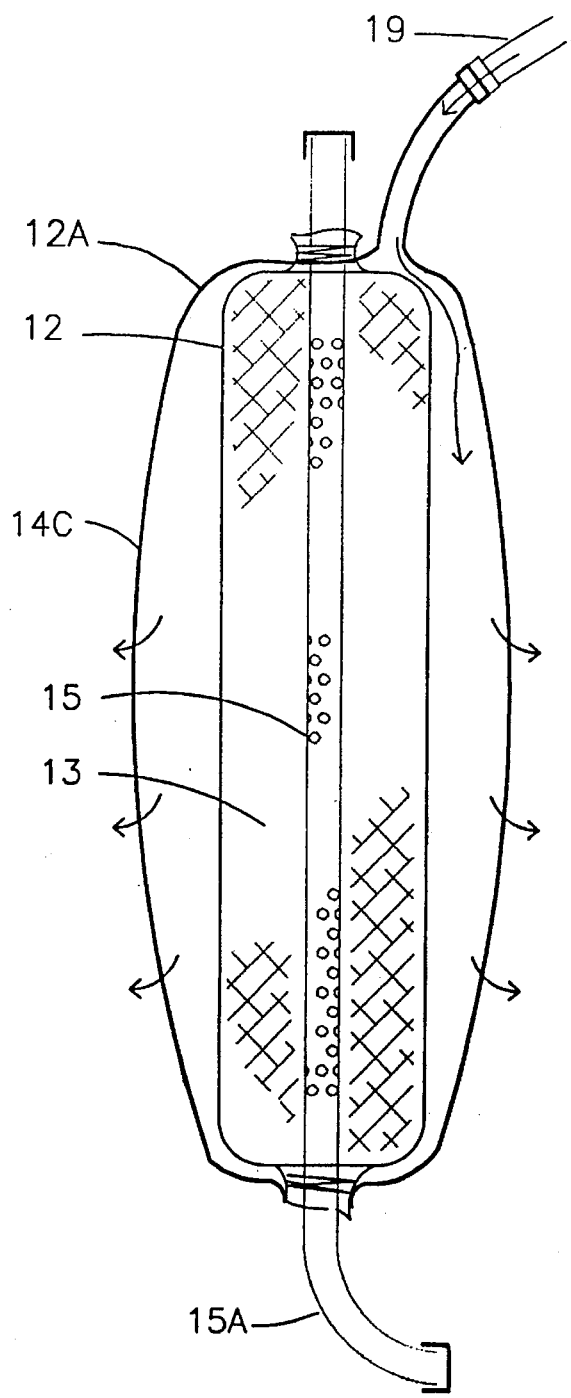
FIG. 10B is a partially schematic cross sectional view of the absorber tube construction as shown in FIG. 10A in purge mode.

FIG. 10A is a partially schematic cross sectional view of an absorber tube construction, which includes a purge tube, during normal operation. FIG. 10B is a partially schematic cross sectional view of the absorber tube construction as shown in FIG. 10A in purge mode. It will be understood that in the normal mode of operation illustrated in FIG. 10A that dirt and contamination will build up on the prefilter 12A. The cleaned liquid exits through the tube 15A. This embodiment of the invention includes a purge connection to which a clean source of water is attached in purge mode as shown in FIG. 10B. The use of the Clean Water with the outlet 15A closed off forces the dirt and contamination off the prefilter 12A.

APPLICATIONS

The sediment dike and absorber apparatus may be used for many different water cleaning, decontamination, and treatment applications including:

1. Decontamination of storm water run-off for parking lots and roofs.
2. Decontamination of ponds, lakes, or other bodies of water.
3. Clean up of process industry waste within or near factories or processing plants.
4. Treatment of process industry waste water.
5. Salvage of chemicals or process materials.
6. Collection of agricultural debris and food product waste.
7. Clean up of rental equipment by a steam washdown.

8. Clean up of car wash facilities to permit recycling of the waste water over and over thereby conserving water.
9. Clean up agricultural irrigation water, drain water and run-off in order to recycle the water.
10. Clean up oil spills and chemical spills by routing all the collected dirty water through this device before allowing it to be drained away.
11. Installation of the apparatus in accordance with the invention on a mobile vehicle that is driven to clean up chemical spills. This form of the invention may include a wash down spray using the recycled drain water and the suction collection unit could quickly clean up any chemical or oil spill as may occur with an overturned oil tanker, or train car. The unit may be adapted to street-sweeper type cleanup operations.
12. Fire trucks or other emergency vehicles could be fitted with small portable units or larger units to address certain emergencies.
13. Small plants or factories may have a number of small units located at certain high risk areas to quickly clean up any spill.
14. Home owners may use a small unit that adapts to a shop vacuum for cleaning up non-explosive type liquid spills. A five gallon size unit with absorber tube assembly cartridge in a rigid form would allow for cleanup of any spilled chemical such as oil, antifreeze, paint thinner, etc. The contaminated water would be drawn and cleaned through the sediment dike and absorber apparatus 10 and the cleaned water would be drawn into the wet/dry shop vacuum container before draining and disposal. The debris may be disposed of in one bag and the contaminated absorber tube in another bag.
15. A small unit could be fitted to catch basins, area drains or floor drains. During light loads it would clean all the oil from the dirty water flowing into it.
16. A floating boom or dike with a long interior absorber tube with internal drain hose could be used for large water body spills. For example, if an oil spill in a lake should occur, the sediment dike and absorber apparatus 10 could be used to encircle the oil spill. The diameter of the spill may be 200 feet. A skimmer pump would be placed within the contained spill and the dirty oil contaminated water would be pumped into the floating dike. Cleaned water would exit the hose ends protruding through the ends of the dike the oil would be absorbed within the absorber tubes for easy disposal. In this form of the invention the outer envelope may have an additional outer portion that is air filled in order to insure buoyant lift and to create a wave splash barrier to prevent oil from drifting over the top of the unit.
17. Fire fighters could collect all the contaminated water generated while fighting certain fires. The contaminated water could be collected and routed through the sediment dike and absorber apparatus 10 before being allowed to flow down the street gutter and drain.
18. Another application may include situations where a liquid chemical is stored within the device and the absorber portion removes unwanted contaminates.
19. The sediment dike and absorber apparatus 10 unit may be used with a pump to continually recycle and clean a body of water such as a pond or lake.
20. The sediment dike and absorber apparatus unit could be used in one of the final treatment stages of cleaning industrial waste or of water treatment.
21. A sediment dike and absorber apparatus unit could be installed in a small housing and be used to clean the oil from the drain-off water from an air compressor.

The apparatus of the present invention is a substantial improvement over the known apparatus for decontamination of liquids including known apparatus for removal of hydrocarbons and other chemicals. The use of the absorber tubes that may be cleaned and the construction of the absorber tubes that permits insertion into an outer envelope is particularly advantageous. In those embodiments of the invention utilizing a flexible outer envelope to defining a dike that will restrain the flow of water from one area to another the invention also accomplishes the dual purpose of correction the removal of contaminants from a liquids, such as contaminated water. The invention separate sediment which may be dumped in a land fill from oil and chemicals that are captured in the absorber tube for separate disposal and reclamation.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

I claim:

1. Apparatus for decontamination of water disposed within a storm drain having an associated inlet and an associated outlet, which comprises:

a sump pump disposed within the associated storm drain;

a filtration assembly disposed at grade elevation above the storm drain, said filtration assembly having an inlet communicating with said sump pump to receive liquid from the associated storm drain, said filtration assembly having an outlet communicating with the outlet of the associated storm drain, said outlet of said filtration assembly having a seal dimensioned and configured for sealing engagement with the associated outlet of the associated storm drain;

said filtration assembly including a flexible outer envelope, means for directing a liquid into said outer envelope, means for directing a liquid out of said envelope, said means for directing said liquid out of said envelope including an axial section of perforate duct and means for absorbing contaminants disposed around said axial section of perforate duct, said means for absorbing and said axial section of perforate duct being disposed within said outer envelope.

2. The apparatus as described in claim 1 wherein:

said means for absorbing contaminants is a particulate material.

3. The apparatus as described in claim 2 wherein:

said means for absorbing includes a sleeve shaped member.

4. The apparatus as described in claim 3 wherein:

said means for absorbing includes a central perforate tube disposed in generally concentric relationship to said sleeve shaped member.

5. The apparatus as described in claim 4 wherein:

said central perforate tube is in fluid communication with the exterior of said outer envelope.

6. The apparatus as described in claim 5 wherein:

said outer envelope is substantially fluid impervious.

7. The apparatus as described in claim 6 wherein:

said outer envelope is an elongated body.

8. The apparatus as described in claim 7 wherein:

said sleeve shaped member is a second tube, said second tube being perforate.

9. The apparatus as described in claim 8 wherein:

said apparatus further includes a prefilter disposed around said particulate absorber material and inside of said second tube.

10. The apparatus as described in claim 9 wherein:

said apparatus further includes a fabric material, said particulate absorber material being disposed within said fabric material, said fabric material having angular sectors defined therein to constrain movement of the particulate material.

11. The apparatus as described in claim 10 wherein:

said angular sectors are defined within an outer cylinder and an inner piece of fabric material that extends sequentially radially inwardly, a first arc, radially outwardly, radially inwardly, a second arc, and radially outwardly.

12. The apparatus as described in claim 11 further including:

in addition to said means for absorbing a plurality of additional means for absorbing.

13. The apparatus as described in claim 12 wherein:

each of said means for absorbing extends generally laterally with respect to said elongated outer envelope.

14. Apparatus for decontamination of water entering a storm drain having an inlet and a grating covering the inlet, which comprises:

a filtration assembly including a flexible outer envelope, said envelope being generally bag shaped, said envelope having an open part surrounded by a collar, said collar being dimensioned and configured for sealing engagement around the periphery of the associated grating whereby surface run off water is directed into said flexible outer envelope, said flexible outer envelope having an outlet communicating with the interior of the associated storm drain;

means for filtering the surface run off water and absorbing oil that is present in the run off water disposed within said flexible outer envelope, said means for filtering the surface run off water and absorbing oil including an axial section of perforate duct and means for absorbing contaminants disposed around said axial section of perforate duct.

15. The apparatus as described in claim 14 wherein:

said means for absorbing contaminants is a particulate material.

16. The apparatus as described in claim 15 wherein:

said means for absorbing includes a sleeve shaped member.

17. The apparatus as described in claim 16 wherein:

said means for absorbing includes a central perforate tube disposed in generally concentric relationship to said sleeve shaped member.

18. The apparatus as described in claim 17 wherein:

said central perforate tube is in fluid communication with said outlet of said outer envelope.

19. The apparatus as described in claim 18 wherein:

said outer envelope is substantially fluid impervious.

20. Apparatus for decontamination of water disposed within a large body of water such as pond or lake which comprises:

a pump disposed beneath the water level in the associated body of water;

a filtration assembly comprising an elongated flexible outer envelope having an elongated flotation chamber extending along substantially the entire axial extent of the elongated flexible envelope, said elongated flotation chamber being dimensioned and configured for floating on the surface of the associated body of water while supporting the entire axial extent of the elongated flexible outer envelope beneath the surface of the associated body of water, said elongated flexible outer envelope having an inlet communicating with said pump to receive liquid from the associated body of water, said elongated flexible outer envelope having an outlet communicating with the associated body of water, said filtration assembly further including an axial section of perforate duct disposed within said elongated flexible outer envelope, said axial section of perforate duct having a means for absorbing contaminants disposed around the extent thereof.

21. The apparatus as described in claim 20 wherein:

said means for absorbing contaminants is a particulate material.

22. The apparatus as described in claim 21 wherein:

said means for absorbing includes a sleeve shaped member.

23. The apparatus as described in claim 22 wherein:

said means for absorbing includes a central perforate tube disposed in generally concentric relationship to said sleeve shaped member.

24. The apparatus as described in claim 23 wherein:

said central perforate tube is in fluid communication with said outlet of said outer envelope.

25. The apparatus as described in claim 24 wherein:

said outer envelope is substantially fluid impervious.

26. Apparatus for decontamination of an associated body of water which comprises:

a pump disposed beneath the water level in the associated body of water;

a filtration assembly comprising an elongated flexible outer envelope, said elongated flexible outer envelope being dimensioned and configured for extending around the entire periphery of the associated body of water, said elongated flexible outer envelope having an inlet communicating with said pump to receive liquid from the associated body of water, said elongated flexible outer envelope having an outlet communicating with the associated body of water, said filtration assembly further including an axial section of perforate duct disposed within said elongated flexible outer envelope, said axial section of perforate duct having a means for absorbing contaminants disposed around the extent thereof.

27. The apparatus as described in claim 26 wherein:

said means for absorbing contaminants is a particulate material.

28. The apparatus as described in claim 27 wherein:

said means for absorbing includes a sleeve shaped member.

29. The apparatus as described in claim 28 wherein:

said means for absorbing includes a central perforate tube disposed in generally concentric relationship to said sleeve shaped member.

30. The apparatus as described in claim 29 wherein:

said central perforate tube is in fluid communication with said outlet of said outer envelope.

31. The apparatus as described in claim 30 wherein:

said outer envelope is substantially fluid impervious.

* * * * *